United States Patent [19]
Poole et al.

[11] Patent Number: 5,455,948
[45] Date of Patent: Oct. 3, 1995

[54] METHOD AND SYSTEM FOR PROVIDING DATA TO AN APPLICATION PROGRAM

[75] Inventors: Richard L. Poole, Garland; Mike D. Jones; Sydney R. Limerick, both of Plano; Stan Limerick; Pamela M. Ouellette, both of Allen, all of Tex.

[73] Assignee: Texas Instruments Incorporated, Dallas, Tex.

[21] Appl. No.: 220,384

[22] Filed: Mar. 29, 1994

Related U.S. Application Data

[63] Continuation of Ser. No. 809,200, Dec. 17, 1991, abandoned.

[51] Int. Cl.$^6$ .............................. G06F 17/30; G06F 13/00
[52] U.S. Cl. .................... 395/650; 395/200; 395/200.01; 395/600; 395/700
[58] Field of Search ..................................... 395/650, 700

[56] References Cited

U.S. PATENT DOCUMENTS

| | | | |
|---|---|---|---|
| 4,506,326 | 3/1985 | Shaw et al. | 364/300 |
| 4,714,989 | 12/1987 | Billings | 364/200 |
| 4,716,528 | 12/1987 | Crus et al. | 364/300 |
| 4,845,624 | 7/1989 | Clayton et al. | 395/600 |
| 5,129,086 | 7/1992 | Coyle, Jr. et al. | 395/650 |

OTHER PUBLICATIONS

Mullen et al, Supporting queries in the O-Raid Object-oriented Database System, Oct. 31, 1990, pp. 245–250.

Koch et al, Using i$^2$F as a data collector for a TIRS-based expert system, May 29, 1991 pp. 249–250.

"Planned or inherited, the mess in DP is real: The challenge of heterogeneous computing, is to get IMS, DB2 and flat file to talk" by Barbara Bochenski, Software Magazine Aug. 1989 v9 n10 p. 49(8).

"The Progress 4GL and RDBMS: shooting for the mainstream" by Judith R. Davis, Patricia Seybold's Unix in the office Sep. 1990 v5 n9 p1 (17).

"Object oriented knowledge bases" by Frank Manola, AI Expert Mar. 1990 v5 n3 p26 (11).

"IBM's data management design" by Judith R. Davis, Patricia Seybold's Office Computing Report Dec. 1989 v12 n12.

*Primary Examiner*—Kevin A. Kriess
*Assistant Examiner*—Michael T. Richey
*Attorney, Agent, or Firm*—Tammy L. Williams; Richard L. Donaldson

[57] ABSTRACT

A method for isolating data and information collection components (data descriptions and locations 124, procedures to access data 126 and operational data 128) from other components (charting 172, report 174, hypertext 176 and visual basic 178) of an application program (106) in a distributed environment (150) comprises the steps to first define data points according to location, structure, and access mechanism for the application program (106). The method groups a plurality of data points (128) into logical collections and overlays on the grouped data points (128) a logic component (102) for deriving information from the data points. Additionally, the method includes directing the grouped data points (128) through the logic component (102) to other components of the application program (106). Grouped data points (128) may be communicated synchronously to an associated workstation (104 and 146) or asynchronously to a background task (148) associated with the application program (106).

5 Claims, 4 Drawing Sheets

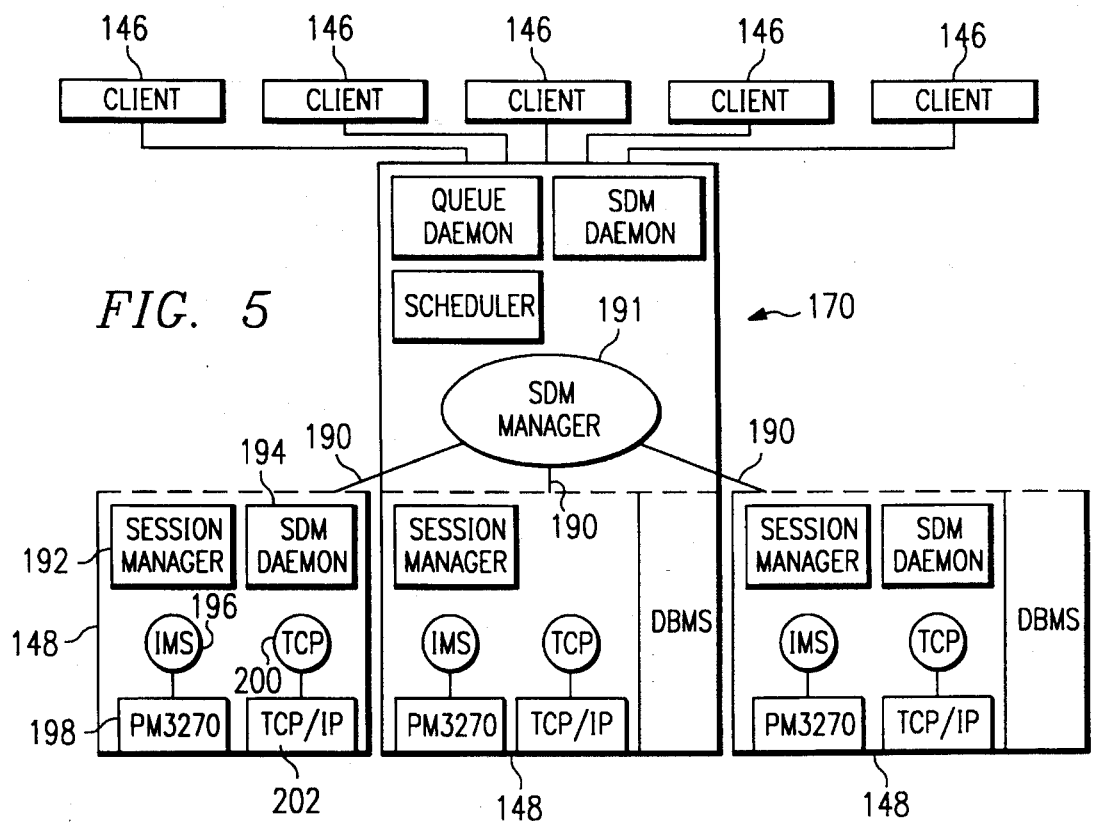
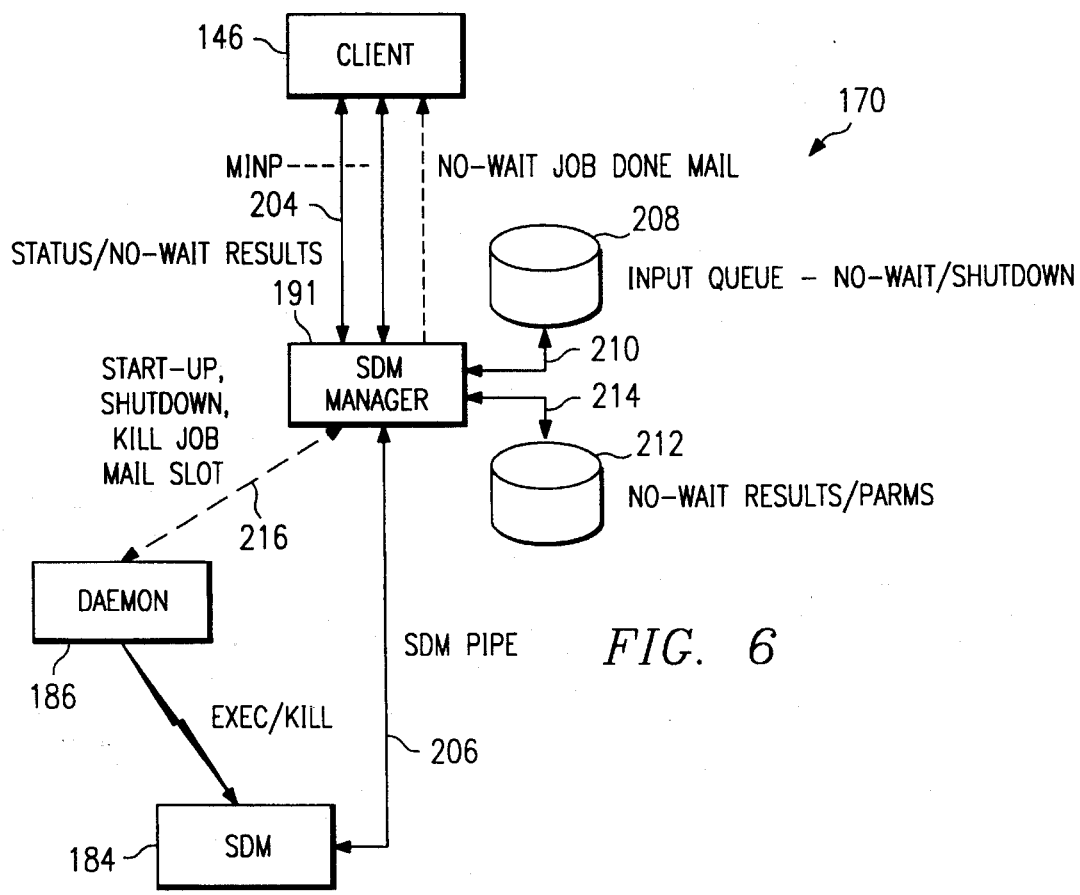

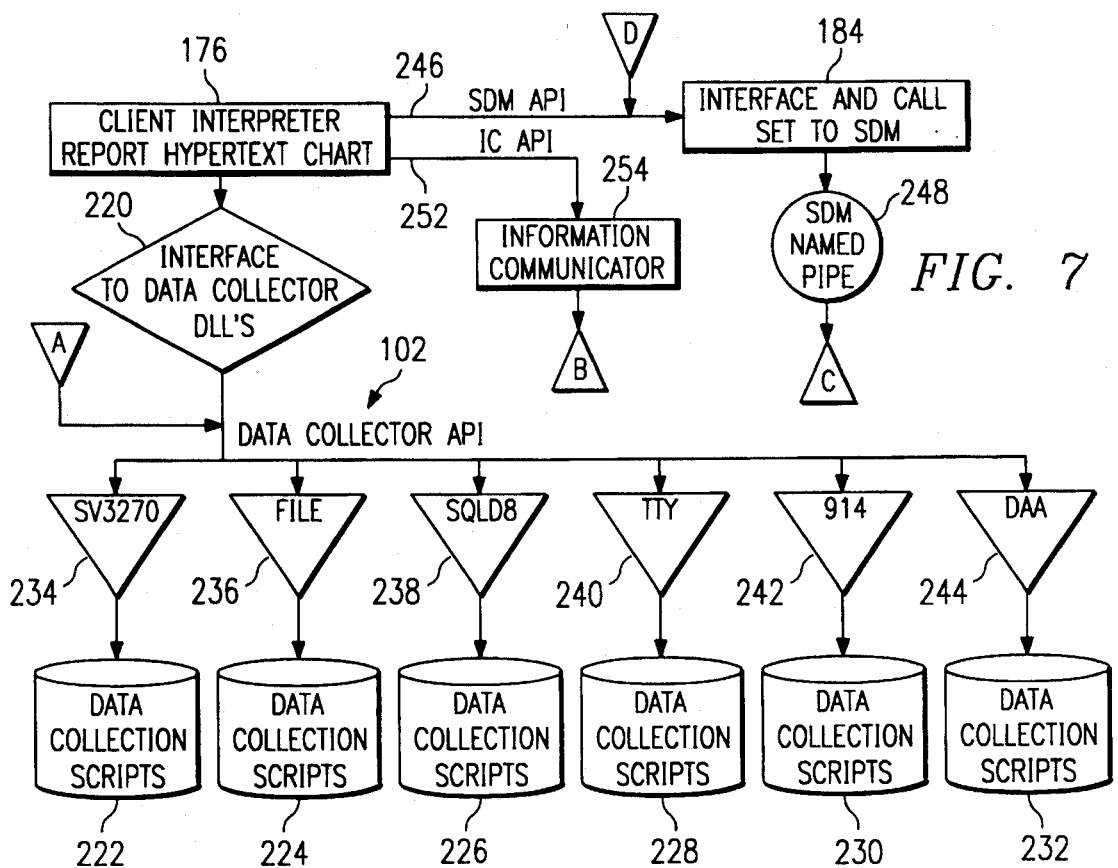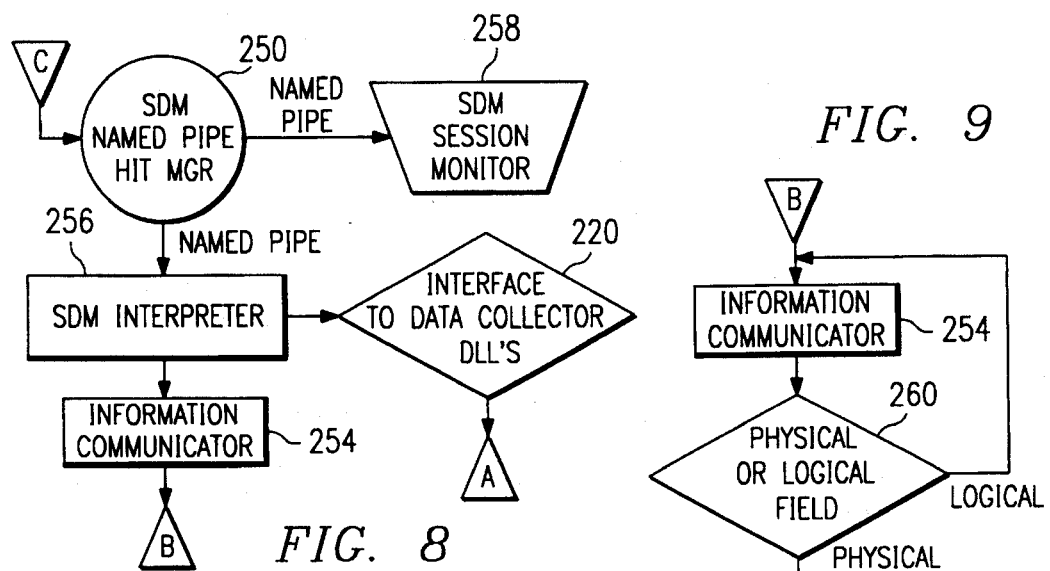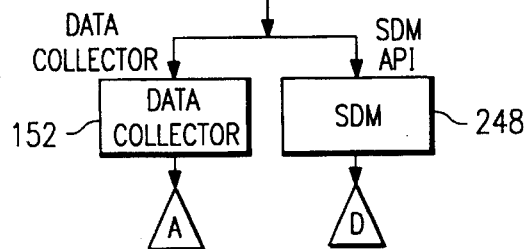

METHOD AND SYSTEM FOR PROVIDING DATA TO AN APPLICATION PROGRAM

NOTICE: COPYRIGHT(C) 1991 TEXAS INSTRUMENTS INCORPORATED

A PORTION OF THE DISCLOSED OF THIS PATENT DOCUMENT CONTAINS MATERIAL WHICH IS SUBJECT TO COPYRIGHT PROTECTION. THE COPYRIGHT OWNER HAS NO OBJECTION TO THE FACSIMILE REPRODUCTION BY ANYONE OF THE PATENT DOCUMENT OR THE PATENT DISCLOSURE AS IT APPEARS IN THE PATENT AND TRADEMARK OFFICE PATENT FILE OR RECORDS, BUT OTHERWISE RESERVES ALL COPYRIGHT RIGHTS WHATSOEVER.

CROSS-REFERENCE TO RELATED APPLICATIONS

This application is a continuation of U.S. application Ser. No. 07/809,200 filed Dec. 17, 1991, and entitled "Method and System for isolating Data and Information Collection Components in a Distributed Environment" by Richard L. Poole, Mike D. Jones, Sydney R. Limerick, T. Stanley Limerick and Pamela M. Ouellette, now abandoned.

TECHNICAL FIELD OF THE INVENTION

The present invention relates to computer software application, and more particularly to a method and system for isolating data and information collection components from other components of client/server application programs in a distributed environment.

BACKGROUND OF THE INVENTION

The client/server world of computing is emerging as an attractive and viable way for large corporations to avoid the limitations existing in mainframe computer applications. A client/server software application environment is one in which a software application program may access and manipulate data from a distributed system (server) or a stand-alone workstation (client). This differs from mainframe operations that require all applications to run directly on the mainframe computer and access data on that mainframe computer.

Many manufacturing processes such as automating manufacturing operations, communicating and displaying documents, and analyzing processes and other information may be more efficiently and profitably performed in a client/server application environment than in a direct mainframe environment. Various information management systems operations may also be more effectively performed in the client/server area. Furthermore, executive information systems of marketing, financial management and general management operations as well as employee data analysis systems can be better performed, in many instances, as client/server application programs than as direct mainframe computing operations.

For large corporations and other large enterprises, however, certain limitations exist in making client/server applications practical. For example, problems exist that prevent clients in large enterprises from locating and directing data to a single location so that a client or server may apply logic or processes on the data in a convenient manner. In these business environments, much of the necessary data is in mainframe computer databases or on various other systems. To take advantage of the flexibility of the client/server desktop applications for client/server computing, there is a need for software tools that allow easy access to the data. A major difficulty exists, however, in that the data that a client or server may need comes from many different sources.

Some software tools attempt provide a client/server data collection component to the desktop application. These attempts, for example, use a fourth generation language that embeds the data collection, the user interface, and component logic in one software tool. As a result, little actual isolation of the data collection component occurs. Isolating the data collection component is necessary, however, to permit a client to build at his desktop the desired application program.

Without any form of effective isolation, there is no way to efficiently change client/server data without also having to change client/server desktop application. In a large corporation, there maybe hundreds or thousands of client/server applications that need to be changed. In such a scenario, changes to the applications may significantly restrict the operation of a manufacturing plant or other facility that uses the data in the database.

Thus, there is a need for a method and system that isolates the client/server desktop application from the data that may exist in a mainframe database or elsewhere.

There is a need for a method and system that permits isolating the data from the logic components in a database, thereby permitting the data to be used for many applications, while at the time permitting the applications to change without affecting the data.

Another limitation that exists in known client/server desktop applications arises due to logic components that are embedded in the data. Known systems require persons writing the user interface for the application to understand the definitions and locations of the data. The person writing the user interface for the desktop application, however, usually is not the person that best understands the data definitions or the structure of the database. This unnecessarily complicates the process of creating client/server desktop applications and limits the ability for these applications to be fully usable by the client.

Therefore, there is a need for a method and system that removes the burden of defining and locating the data from the client that creates the user interface for the desktop application and that places that burden on the person that constructs the database.

In a large corporation, yet another problem occurs without isolation between the data components and the other components of the particular client/server application. The problem is that with known client/server applications a large corporation must take all data (which may in various or different forms and at different locations) and place the data in a common database so that the various client/server applications may access the data. What results in this situation, however, is that corporations place a tremendous amount of redundant data in a common database to permit the client/server application to access the data. This evolution often takes a large amount of effort on the part of the corporation or enterprise. Additionally, in translating the data from its native form to a common database, numerous occasions for error may occur.

As a result, there is a need for a method and system that permits accessing data elements or data points in there native form without having to translate or input data in a common database for client/server applications.

SUMMARY OF THE INVENTION

The present invention, accordingly, provides a method and system for isolating data and information collection components from other components of an application program in a distributed environment that overcomes or reduces disadvantages and limitations associated with prior client/server desktop application program tools.

One aspect of the invention is a method for isolating data and information collection components from other components of an application program in a distributed environment. The method comprises the steps of first defining data points according to location, structure, and access mechanism for the application program. The method also includes grouping a plurality of data points into logical collections and overlaying on the grouped data points a logic component for deriving information from the data points. Additionally, the method includes directing the grouped data points through the logic component to the other components of the application program. In the present invention, the grouped data points may be communicated synchronously to an associated workstation or asynchronously to a background task associated with the client/server application program.

The method and system of the present invention provide a way for the user interface component of an application program to operate independent of data and the source of the data. The present invention achieves this result in the context of a script processor. The data retrieval/update method of the present invention is separate from both the using interface component and its associated logic. Therefore, the present invention permits moving the source of data without changing the user interface component. This allows the client or server to use many tools to analyze the data.

A technical advantage of the present invention is that instead of ignoring the data collection or embedding the data collection within the user interface component, the present invention isolates the data and information collection components from other components of the application program in the distributed environment.

Another technical advantage is that the present invention creates "pluggable" components that a client or server may use in many applications. For example, the client or server may have one data collector that interfaces with the transaction that hundreds of clients or servers may use. With the present invention, the user may go out and change that one data collector when a transaction changes and all of the many applications will immediately work with the changed data collector. This significantly improves the maintenance of the applications utilizing data over time. In a large company or enterprise, this technical advantage may be very important for database management.

Another technical advantage of the present invention is that by isolating the data and information collection components from other components of the application program, only the persons that set up the databases or define the screen elements for the data need to know the data definitions. This significantly simplifies the client/server application programming problem.

Another technical advantage of the present invention is that by isolating the data and information collection components from the other components in the application program, it is possible to more easily generate distributed databases that contain important data and information. As a result, the method and system of the present invention permit information access on a much broader scale than that which known client/server desktop applications provide.

Yet another technical advantage of the present invention is that, by isolating the data and information collection components from other components in the application program, it is possible to access data in its native form. This eliminates the redundant data problems and translations errors that may occur when putting all necessary data into a common database for existing client/server application programs.

Another technical advantage that the present invention provides is a method and system that allows running data collection processes synchronously on a client workstation or asynchronously onto a separate server to permit the desktop application to return to another application. For example, in many client/server application programs, it is desirable to collect substantial amounts of data for a single client or for multiple clients at different times. Therefore, the present invention provides the ability for the user to direct a data collection process to a server and permit a client to simultaneously perform another operation during the data collection process.

BRIEF DESCRIPTION OF THE DRAWINGS

The invention and its modes of use and advantages are best understood by reference to the following description of illustrative embodiments when read in conjunction with the accompanying drawings, wherein:

FIG. 5 illustrates the data collector channels for submitting a data collection process to the server data manager of the preferred embodiment;

FIG. 6 provides a more detailed block diagram of the server data manager of the preferred embodiment; and FIGS. 7 through 9 provide flow diagrams for various applications of the preferred embodiment.

DETAILED DESCRIPTION OF THE INVENTION

The preferred embodiment of the present invention is best understood by referring to the FIGUREs, wherein like numerals are used for like and corresponding parts of the various drawings.

Figure 1:
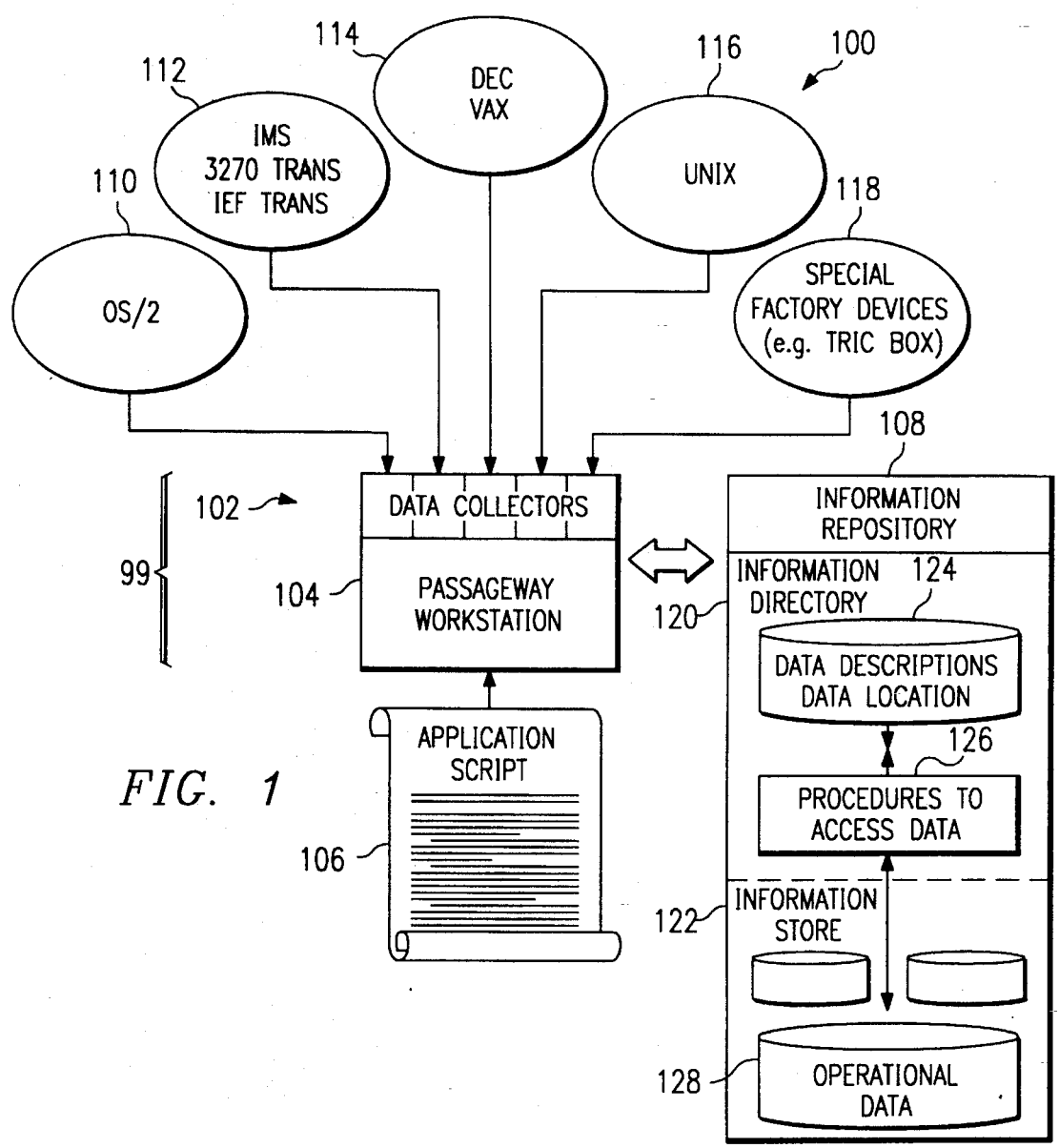
FIG. 1 conceptually illustrates data collector isolation according to the preferred embodiment of the present invention.

FIG. 1 conceptually illustrates the environment that the preferred embodiment establishes. The preferred embodiment provides a software enabling tool that allows a client/server application developer to use many types of operating systems to build client/server applications. The preferred embodiment establishes application programming environment 100, which has as its primary elements data collectors 102 associated with workstation 104. The preferred embodiment isolates the application script 106 from the data collectors 102 and further isolates the data appearing in information repository 108 from the mechanisms of retrieving the data. The mechanism that retrieve the data may include various platforms that communicate with operating systems or facilities such as OS/2 110 platform IMS 112, DEC VAX platform 114, UNIX platform 116, as well as various special factory devices (e.g., TRIC BOX) 118. Within information repository 108 may be information directory 120 and information store facility 122. Information directory 120 includes data descriptions and data locations 124 as well as data access procedures 126. Information store 122 may contain, for example, operational data 128 applicable to application script 106.

The preferred embodiment provides a way to isolate the data points from their user interface components of the workstation 104 and the various platforms or mechanisms 110 through 118 that retrieve data. Using a "pluggable" concept, the preferred embodiment permits data to come from many different sources for use in particular application 106. If there is another platform or component that the server desires to add to the workstation, the preferred embodiment simply lets the user add the application to the workstation. This provides a development environment for any number of client/server applications.

The "pluggable" data collectors 102 of the preferred embodiment make it possible to save data descriptions, data locations, and data collection methods in information repository 108 and then to share the data descriptions, data locations and data collection methods with a wide variety of clients or users. Therefore, one person may write a data collector and numerous clients or users may use the data collector for various applications.

The preferred embodiment uses information communicator and data collector scripts for data retrieval/update operations. There are specific command sets and rules which apply to both information communicator and data collector scripts. Computer Listing C provides illustrative examples of the data collection script files useful with the preferred embodiment. The building block of data collection script files are view definitions which describe data locations and relationships, and command sequences required to interact with the data. The building blocks of the information communicator script files are script file functions or commands.

Data collectors 102 allow access to data on various hosts, databases, and files. Data collectors 102 are used to retrieve and store data. Data collectors 102 handle the interface between an application script and a medium where the data is stored, for example, IMS 112. Data collectors 102 may run in the foreground from an application script or in the background as an SDM job (see below). In distributed environments, the preferred embodiment runs data collectors 102 in the background. This is because client workstations are able to perform other tasks while the background tasking is running. Additionally, network traffic will be less if the data collection job is run on a machine where the data resides or the host access resides.

The preferred embodiment uses separate data collectors for different data types. The initial data collectors provided include the DDE data collector, a FLATFILE data collector, SERV3270 collector, and SQLDB data collector, a Telnet data collector, and a WIN914 data collector. Computer Listing A, which is here expressly incorporated by reference, provides a Application Program Interface Specification for the data collectors 102 of the preferred embodiment.

The DDE data collector provides a way to communicate data from other applications that support DDE. The FLATFILE data collector provides a preferred way to read and write data through personal computer "FLATFILES" PC FLATFILES are ASCII text that are not in any priority format. The SERV3270 data collector provides data collection from a 3270 host. To use the SERV3270 data collector, in the preferred embodiment a session manager and 3270 emulator must be running on a server. The server machine can be either the client or a server of the client may access. The SQLDB data collector retrieves and stores data in an SQL database. The preferred embodiment initially supports Microsoft's SQL server or FairCom SQL server. The Telnet data collector retrieves and stores data on any host that maybe accessed using a TCP/IP based Telnet emulator. The WIN914 data collector provides data collection from a 3270 host. This data collector runs on a DOS machine with a local 3270 emulator and Windows. Computer Listing B, which is here expressly incorporated by reference, provides illustrative examples of source code header files according to the preferred embodiment. Computer Listing C, which is here expressly incorporated by reference, provides various data collector script file samples according to the preferred embodiment.

Figure 2:
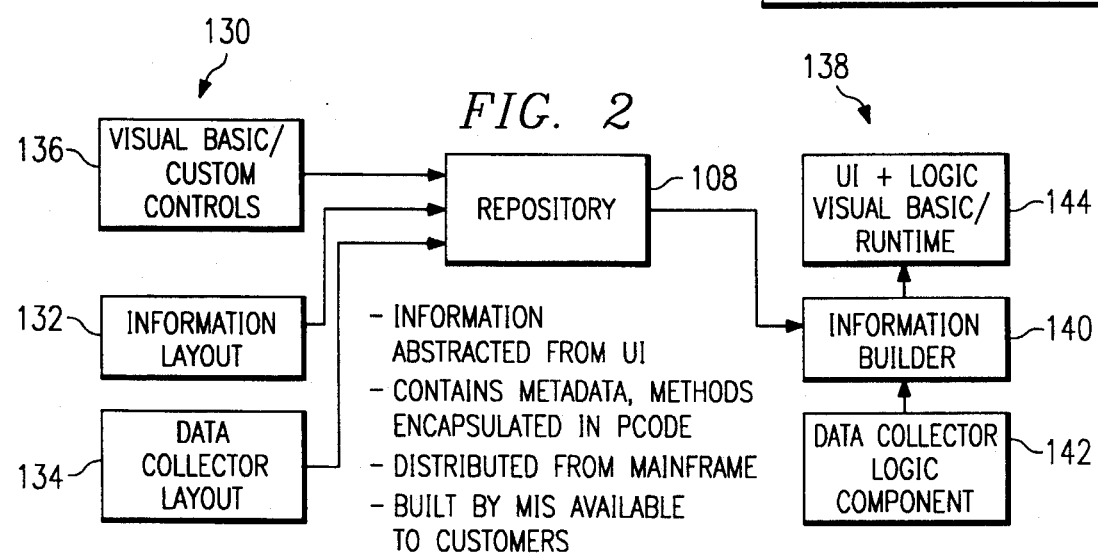
FIG. 2 provides an illustration of the client/server application development and run-time environments of the preferred environment.

FIG. 2 shows that the preferred embodiment comprises two sides that implement the data and information collection isolation features of the preferred embodiment. Referring to FIG. 2, development side 130 comprises information layout 132 and data collector layout 134. Additionally, Visual Basic custom control 136 shows that on developer side 130 it is possible to have multiple user interface builders. On development side 130, data collector layout 134 permits the client/server to build the data collector itself. Information layout 132 permits the client to build Information logic components on top of the data collector.

Using the information layout 132 and data collector layout 134, the preferred embodiment permits a client who develops the data collector using data collection layout 134 and who builds Information logic components using information layout 132 to control and use effectively data definitions that go into repository 108. Through Visual Basic custom controls 136, it is possible to use an off-the-shelf user interface builder to direct data definitions and data locations into repository 108. Repository 108 is a shared place that stores data descriptions, data locations, and data access methods (scripts) 124, and may be shared across various platforms.

The preferred embodiment also includes a run-time component or side 138 which may either operate as a true run-time application or may also serve as a way that a different client may develop an application that has access to repository 108. In the run-time component 138, information builder 140 may receive the data mechanisms from repository 108. The preferred embodiment includes data collector interpreter 142 to interpret the data mechanism from repository 108. Information builder 140 provides the data interfaces for Visual Basic for run-time outputs 144 that may go to a factory or other environment that has a client/server application program.

According to FIG. 2, therefore, the preferred embodiment abstracts information from a user interface and provides a way for the client to describe the user interface. As a result, when the user knows the data description of interest, the preferred embodiment permits the user to describe the data in general terms for insertion in repository 108. The preferred embodiment, therefore, permits a person who defines the data points to do so in a way that allows other users to identify the data according to English-like terms. Moreover, the preferred embodiment may permit MIS (Management Information Systems) departments, for example, to more effectively control the data definitions and how clients use the data in a particular environment. To achieve the above purposes, the preferred embodiment provides collector layout 134, information layout 132, collector interpreter 142 and information builder 140. Other configurations for this purpose, however, may be established according to varying purposes but still be within the scope of the present invention.

Figure 3:
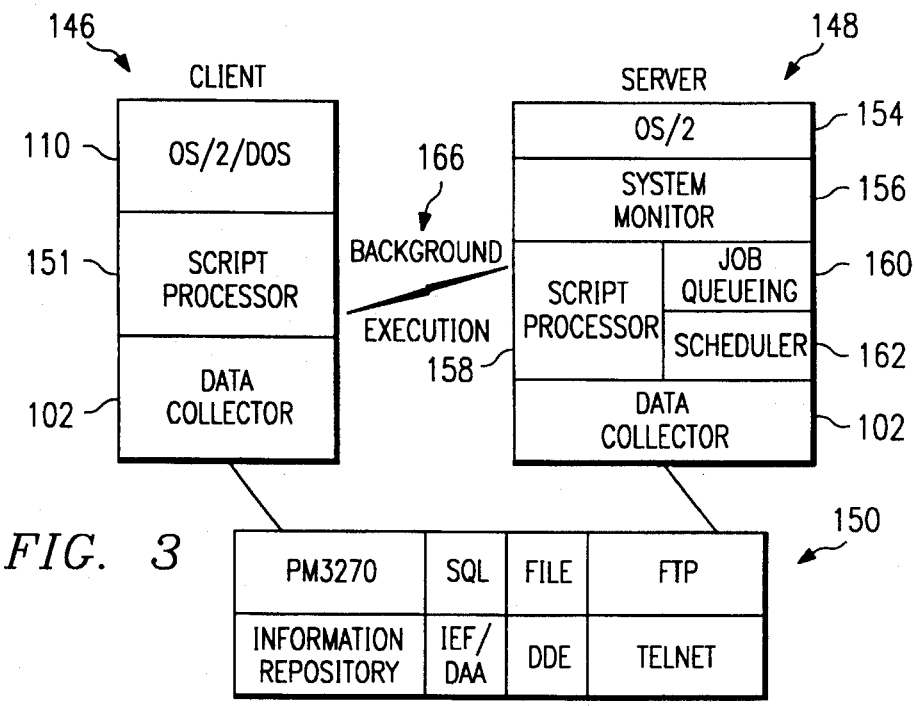
FIG. 3 conceptually illustrates the server data manager portion of the preferred embodiment.

FIG. 3 provides a conceptual illustration of the client/server environment that the preferred environment addresses. FIG. 3 shows the client application 146 and server application 148, both of which have direct access to the various hosts, databases, and files or facilities 150. Client application 146 uses the OS/2 or DOS platform 110 to go through script processor 151 to data collectors 102. Similarly, server application 148 operates from OS/2 platform 154 through system monitor 156 and script processor 158 (including job queuing and scheduler facilities 160 and 162, respectively) to data collector 102. Data collector 102 permits server application 148 to communicate with facilities 150.

FIG. 3 conceptually illustrates how the preferred embodiment may operate synchronously between client application 146 and facilities 150 or by way of background execution path 166 operate asynchronously in server application 148. Although server application 148 may have a real-time characteristic, one of the purposes of server application 148 is to permit background execution so that client application 146 may proceed with another task while server application 148 collects and processes data points.

Facilities 150 may include various hosts, databases, and files such as a 3270 host that may be accessible using PM3270 on a OS/2 machine or 914C/G on a DOS machine, the SQL database management system, a FLATFILE facility for accessing ASCII files, a file transfer package (FTP) facility, information repository 108, the Texas Instrument Information Engineering Facility (IEF) or DAA, Dynamic Data Exchange (DDE), and a full screen interface such as Telnet. Each of the facilities 150 may have significant differences from each other. According to the preferred embodiment, however, a single set of data collectors 102 (see FIG. 1) may be used for client application 146 and a single set of data collector 164 or server application 148. Thus, using the data collectors 102 for client application 146 or data collector 102 for server application 148, it is possible to write a single client/server desktop application and obtain data from a wide variety of sources within facilities 150.

Figure 4:
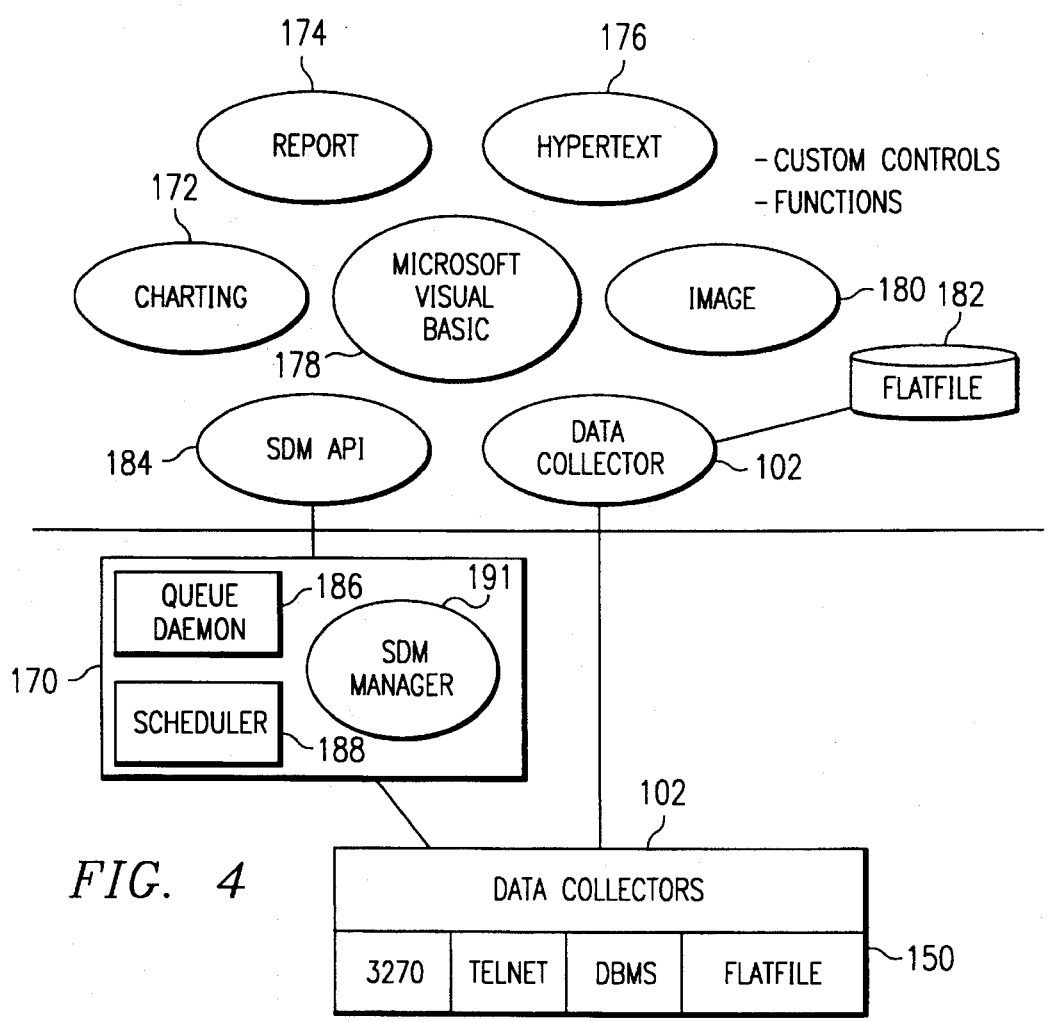
FIG. 4 provides a block diagram of the client/server desktop environment architecture of the preferred embodiment.

FIG. 4 illustrates an individual client/server desktop environment architecture for the preferred embodiment. An essential element of the preferred embodiment is the server data manager (SDM) 170 that interfaces the data collectors 102 and facilities 150. FIG. 4 illustrates how SDM 170, facilities 150, and data collectors 102 work together. User interfaces may be built with tools such as Microsoft's Visual Basic and would include charting 172, report 174, hypertext 176, and image 180 processing. Additionally, data collectors 102 may receive data from FLATFILE 182, for example for accessing an ASCII file. The various functions 172 through 180 show facilities through which the preferred embodiment may present data to any number of user interfaces that can retrieve information using a data collectors. The user interface application utilizing functions 172 through 180 may connect to a data collector 102 that retrieves data from facilities 150. These applications call data collectors 102. Data collectors 102 then control specific data collectors to interface with a specific facility to provide the necessary data for the application.

FIG. 4 also illustrates that a particular application may cause SDM 170 to obtain the desired data points. When SDM API 184 calls SDM 170, SDM 170 offloads the data collector to a background server and, as a result, provides yet another isolation layer between the applications 172 through 180 and the facilities 150. SDM 170 includes queue demon 186 and scheduler 188 that direct the data collection component to a background server and monitor the particular jobs as they progress.

Associated with facilities 150 are a plurality of data collectors 102 that access hosts, databases, and files according to the particular client/server application. To access facilities, a client has the option of either synchronously going to data collector 102 or asynchronously using SDM 170 to access the data.

FIG. 5 provides a more detailed block diagram of the operation of the SDM 170 of the preferred embodiment. According to FIG. 5, SDM 170 may service numerous clients 146 at the same time. While serving multiple clients 146, SDM 170 may use multiple channels 190 to spread the data collection over numerous servers 148. Servers 148 consist of several components including session managers 192 and SDM daemon 194 to interface with various host environments. Each server 148 may contain, for example, an IMS transaction process 196 that interfaces with the 3270 emulator to reach a host 3270 mainframe environment. Additionally, using the TCP 200 communication channel through the TCP/IP 202 protocol stack, it is possible to communicate with other host environments.

FIG. 6 provides yet a further detailed illustration of the SDM 170 of the preferred embodiment to explain how SDM 170 communicates through client application 146 and SDM application 184. In particular, FIG. 6 shows the use of named pipes 204 between client application 146 and SDM manager 191 to illustrate that SDM manager 191 has the ability to queue jobs off to another SDM 184 via SDM named pipe 206, to input queue 208 via input queue named pipe 210, to no-wait results/parms 212 via named pipe 214, and to daemon 186 via named pipe 216. In the event that SDM manager 191 receives more jobs than it can handle at one time, client 146 may direct the preferred embodiment to start a particular job and direct that the SDM manager 191 queue the other synchronous jobs off to disk to play them when the gateway is available. In essence, therefore, FIG. 6 illustrates the inter-operability and flexibility of the SDM 170 environment of the preferred embodiment.

SDM 170 performs execution of any job not requiring user interaction as a separate job from the client's script (in the background) certain fundamental considerations are necessary to start the SDM, establish an SDM session, and execute a background job. An SDM job can be used to collect data from a file, a database or a host. Before background jobs were run, however, the SDM job manager SDM must be running. This is the process that usually performs execution of the background jobs. In the preferred embodiment, SDM 170 must be started at the server machine on which a client wishes run the SDM.

In distributed environments, a system administrator may start the SDM job manager and leave it running continuously. The only time SDM would need to be shut down is prior to shutting down the machine on which it is running. The advantages of leaving SDM up are first that less time will be required by a client workstation to submit a job to be run. Additionally, the status of any host resource will be known at any time.

In stand-alone, OS/2 environments, if the client has other programs running that require the use of the same host resource, the script may start and stop the SDM as necessary.

Note, however, that the SDM can also be left running all the time on a stand-alone system if memory is not a concern.

FIG. 7 shows the use of a client/server application program that has the data collectors 102 of the preferred embodiment to obtain data from various hosts, databases, and files. In the example of FIG. 7, client report, hypertext, and chart 176 may require data from a variety of sources. For the needed data, report, hypertext, and chart 176 communicates with interface-to-data-collector dynamic link libraries (DLL's) 220 and to data collectors 102 to reach the various data collection scripts 222 through 232. Each of the data collection scripts 222 through 232 may contain data that the client report, hypertext, or chart 176 needs. In order to access the data collection scripts 222 through 232, the preferred embodiment provides data collectors 102 which may include the SV3270 data collector 234, the FLATFILE data collector 236, SQLDB data collector 238, TTY data collector 240, 914 data collector 242, or the DAA data collector 244.

A client may generate other data collectors consistent with the preferred embodiment, depending on the form of the data of interest. Each of the data sources may be in a single host or database, or may be in multiple hosts or databases depending on the native form of the data itself.

One of the important aspects of the preferred embodiment is its architecture that provides a way to isolate from the data the logic component of the application program. By isolating the data component for a particular program from its associated user interface component in the client/server application program, the preferred embodiment permits each of the data collectors to be "pluggable" into the client/server application environment. As a characteristic of the data collectors being "pluggable," the preferred embodiment allows the data collectors 102 to be in a wide variety of different locations and to be moved into different locations.

To understand the operation of the environment that FIG. 7 illustrates, suppose that a client desires a piece of data from one of the data collection scripts 222 through 232. All that client application 176 needs to know to obtain this data is the name of the data collection scripts containing the desired data. With this name, the client 176 may call through interface 220 to data collectors 102 to go and get the data and retrieve it for the user interface application 176.

The preferred embodiment permits the client 176 to go through interface 220 and data collectors 102 to obtain data from the data collection scripts, irrespective of the form in which the native data may be found. Thus, all that a client/server application needs to identify is the name of the script file, the view of that data in the script file, and the name of the data point. Then, the data collectors 102 will direct the appropriate data collectors 234 through 244 to go out and obtain the data from the appropriate data collection scripts 222 through 232, run transactions, open databases talk to any other machines necessary and obtain the data point and bring it back for use by the client interpreter, report, hypertext, or chart 176.

The preferred embodiment, therefore, permits a client to write an initial client/server application program using just a simple flat file on a workstation, for example, and then replace it with a database running out on a server. As long as the data views and the names do not change, the application logic for the client/server application will not change. This is because the client application program will reference the data by name and the information communicator 254 may move freely back and forth between particular data collectors 234 through 244. The only thing that changes according to the call from the client 176 is the location of the data collector script.

Data collection scripts 222 through 232 may be located in an information repository such as information repository 108 of FIG. 1. The data collection scripts 222 through 232 inform the data collectors 102 of the data locations and how to acquire the data. For example, to execute an IMS transaction, data collection script 222 may tell data collector 234 how to execute the IMS transaction to obtain the data from the mainframe and return it to client 176.

Interface 220 is standard across all data collectors 102 and provides the isolation for the preferred embodiment. As a result, the preferred embodiment permits moving data from one point to another without changing the calls that report, hypertext, or chart 176, for example, makes into data collectors 102 themselves. Interface 220 may be extended to any number of individual data collector files. This permits writing a new data collector file or DLL as long as the designer observes the programming rules of interface 220. In the preferred embodiment, however, specific "hooks" exist for specific interfaces unique to various types of data collectors. This permits a user to easily extend interface 220 by using the hooks in the interface for a new data collector.

FIG. 7 also shows a connection to the SDM API interface 184 through path 246. Interface 184 directs program flow through SDM named pipe 248 to SDM named pipe hit manager 250 of FIG. 8. Additionally, from client 176 may come an information communicator application via path 252. FIG. 9 more particularly describes information communicator 254 operation.

The following description more particularly details the specific of communicating data points using the data collectors of the preferred embodiment. To begin, the 3270 or 914 data collectors provide ways to communicate data to a 3270 host. A 3270 host is any host that may be accessed using 914C/G on a DOS machine, or PM3270 on an OS/2 machine. These hosts include IMS and TSO. Data on a 3270 host may only be updated by running an existing inquiry or transaction. Data on a 3270 host can only be retrieved from screens displayed as a result of an existing inquiry. There are two 3270 data collectors in the preferred embodiment, a SERV3270 and a WIN914 data collector.

The SQLDB data collector has application in accessing a database. The preferred embodiment may access the relational database management systems (DDMS) that Microsoft SQL Server FairCom's SQL Server Support. The preferred embodiment includes an application program interface to allow the use of the same commands by the preferred embodiment regardless of the relational DBMS that is running. Script commands that the preferred embodiments use are commands to use both distributed and stand-alone systems. Computer Listing D comprises a listing of the SQLDB data collector command.

The DDE data collector of the preferred embodiment allows the client to invoke DDE to send data to or retrieve data from an application that supports DDE. The application that the system communicates with is known as the server application.

Referring to FIG. 8, from SDM named pipe 248 SDM named pipe hit manager 250 may direct client/server application program flow to SDM interpreter 256 and SDM session monitor 258. SDM interpreter 254 may direct program flow to information communicator 254 for information communicator operations or to interface to data collector DLL 220 (see FIG. 7).

Referring to FIG. 9, if information communicator 254 receives program flow from either SDM interpreter 256 or directly from client 176, the information communicator segment of the preferred embodiment will query whether the desired data is a physical or logical field at queue 260. If information communicator requires a logical field, flow returns to information communicator 254. Otherwise, the queue for a physical field may go either to data collector 152 or SDM API interface 184.

Use of data collector in the preferred embodiment requires five basic steps. The first steps is to write the data collection script that defines one or more views of data. A view is a group of data collector statements that specify fields and data to be retrieved/stored, and how that data is to be accessed. The data collector script may have any file extension. The default (and convention) file extension for the preferred embodiment is "dcs". The next steps are performed by issuing data collector script commands directly from an application script or from an information communicator script. Information communicator script is a file containing data collector and other commands for the preferred embodiment that select views to process, select the fields to process, and combine the data into a useful information view. An information collection script may have any file extension, however, the preferred embodiment uses the default and convention (file extension of ".scr".) which may be used, for example in the C or Pascal language. The data collection steps are the following:

1. Define views of the data using the data collector script;

2. Start the data collector for the desired host and specify the data collector script to use, using the application script;

3. If data is to be obtained, the next step is to select the view and then get the fields from the view, using application script. On the other hand, if data is to be put or sent to a host application the data collector selects the view, puts data in the specified view's fields and then stores the view, again using that application script. The final steps is to stop the data collector this also requires an application script.

Once a data collector is started, the application or information communicator script may select a view of the data from the data script. After the view is selected, fields can be retrieved from the view or updated. If fields from the view are updated, the updated view may be saved. For the preferred embodiment, the data collector commands used in the application or information communicator script will be the same regardless of the data collector type. The statements in the data collector script, however, will vary depending on which data collector is being used.

Computer Listing D, which is here expressly incorporated by reference, provides more detailed information and examples for data collectors and SDM 170 for the preferred embodiment.

In summary, the preferred embodiment is useful in developing applications that can communicate, display and chart data between multiple client/servers and multiple computer platforms. The method and system of preferred embodiment support not only distributed systems but also stand-alone workstations in a client/server architecture. Using the client/server architecture splits the functions performed between a "front-end" client workstation that displays data and a "back-end" server that processes the data. The preferred embodiment uses a server and client workstation connected through a local area network (LAN) with the server running under OS/2 or UNIX operating system and the client workstations running under Windows on a DOS machine or Presentation Manager on an OS/2, UNIX, or Novell machine. In a stand-alone workstation configuration, the preferred embodiment performs both data display and manipulation under the Windows environment DOS machine or Presentation Manager on an OS/2 machine.

Although the invention has been described with reference to the above specific embodiments, this description is not to be construed in a limiting sense. Various modifications of the disclosed embodiment, as well as alternative embodiments of the invention will become apparent to person skilled in the art upon reference to the above description. It is, therefore, contemplated that the appended claims will cover such modifications that fall within the true scope of the invention.

What is claimed is:

1. A method for providing to an application program running on a first computer data elements in a desired format and having a desired definition, the data elements stored in a data source having a data source type and a location, comprising:

storing separately from the application program an information builder and a server data manager for identifying the information builder and a script file containing the desired definition and the data source type;

storing a plurality of data collectors on the computer, one of said plurality of data collectors having a logic component designed to interface with said data source type;

calling the server data manager with the application program;

identifying with the server data manager the script file and the information builder to the data collectors;

activating said one of said plurality of data collectors having said logic component designed to interface with the data source type;

providing with the logic component the data in the desired definition to the information builder;

converting with the information builder the data from a stored format into the desired format; and providing with the information builder the converted data to the application program.

2. The method of Claim 1 wherein the step of storing separately comprises storing the interface builder and the server data manager on a second computer.

3. The method of Claim 1 wherein the step of activating comprises reading the script file with a plurality of common interfaces, one of said plurality of common interfaces associated with said one of said plurality of data collectors such that said one of said one of said plurality of common interfaces activates said one of said plurality of data collectors.

4. The method of Claim 1 further comprising running the information builder and said plurality of data collectors in the background with respect to the application program.

5. The method of Claim 1 further comprising providing the location to said one of said plurality of data collectors with the server data manager.

* * * * *